United States Patent [19]
Sekine et al.

[11] Patent Number: 5,939,997
[45] Date of Patent: Aug. 17, 1999

[54] DETECTION METHOD OF BUS TERMINATION

[75] Inventors: Kazutoyo Sekine, Irvine; Daniel Lotocky, Fullerton, both of Calif.

[73] Assignees: Sony Corporation, Tokyo, Japan; Sony Trans Com Inc., Irvine, Calif.

[21] Appl. No.: 08/739,874

[22] Filed: Oct. 31, 1996

[51] Int. Cl.[6] ...................................... H04N 7/18
[52] U.S. Cl. .............................. 340/825.06; 340/825.05; 340/825.16; 340/825.08; 340/825.77; 340/825.78; 370/489; 370/257; 381/77; 381/80; 381/82; 381/86
[58] Field of Search .................. 340/825.16, 825.08, 340/825.77, 825.78, 825.06, 825.05; 370/489, 257; 381/77, 80, 82, 86

[56] References Cited

U.S. PATENT DOCUMENTS

| | | |
|---|---|---|
| 3,795,771 | 3/1974 | Gundersen et al. . |
| 4,853,555 | 8/1989 | Wheat . |
| 4,866,515 | 9/1989 | Tagawa et al. . |
| 4,896,209 | 1/1990 | Matsuzaki et al. . |
| 4,897,714 | 1/1990 | Ichise et al. . |
| 5,123,015 | 6/1992 | Brady Jr., et al. . |
| 5,365,515 | 11/1994 | Graham ............................... 340/825.16 |
| 5,404,567 | 4/1995 | DePietro et al. . |
| 5,557,541 | 9/1996 | Schulhof et al. . |
| 5,568,484 | 10/1996 | Margis . |
| 5,586,937 | 12/1996 | Menashe . |
| 5,705,860 | 1/1998 | Ninh et al. ............................... 348/820 |

*Primary Examiner*—Michael Horabik
*Assistant Examiner*—Yves Dalencourt
*Attorney, Agent, or Firm*—Blakely, Sokoloff, Taylor & Zafman LLP

[57] ABSTRACT

A system for detecting whether a bus used to connect units in an in-flight entertainment system is properly terminated. A detection circuit generates a bus termination signal when a terminating cap properly terminates the bus. Prior to installation of the terminating cap, a bus coupling contact of the detection circuit is maintained in a logic high or asserted state. A detection loop in the terminating cap grounds or deasserts the bus coupling contact when the terminating cap is properly installed. A microcontroller determines whether the bus coupling contact is grounded and signals a managing unit of the condition. The managing unit may display an appropriate error message to notify service personnel of the improper termination.

22 Claims, 4 Drawing Sheets

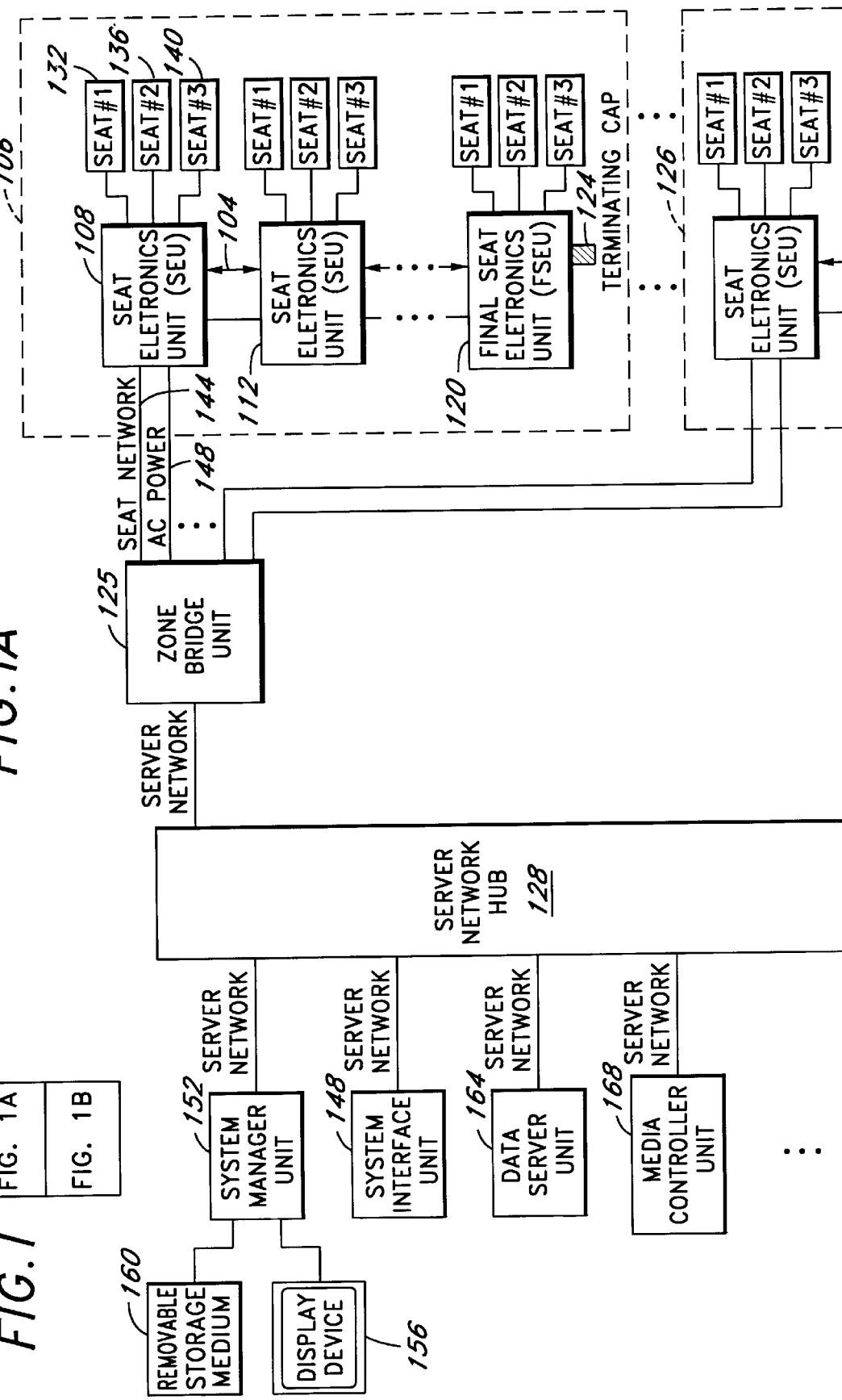

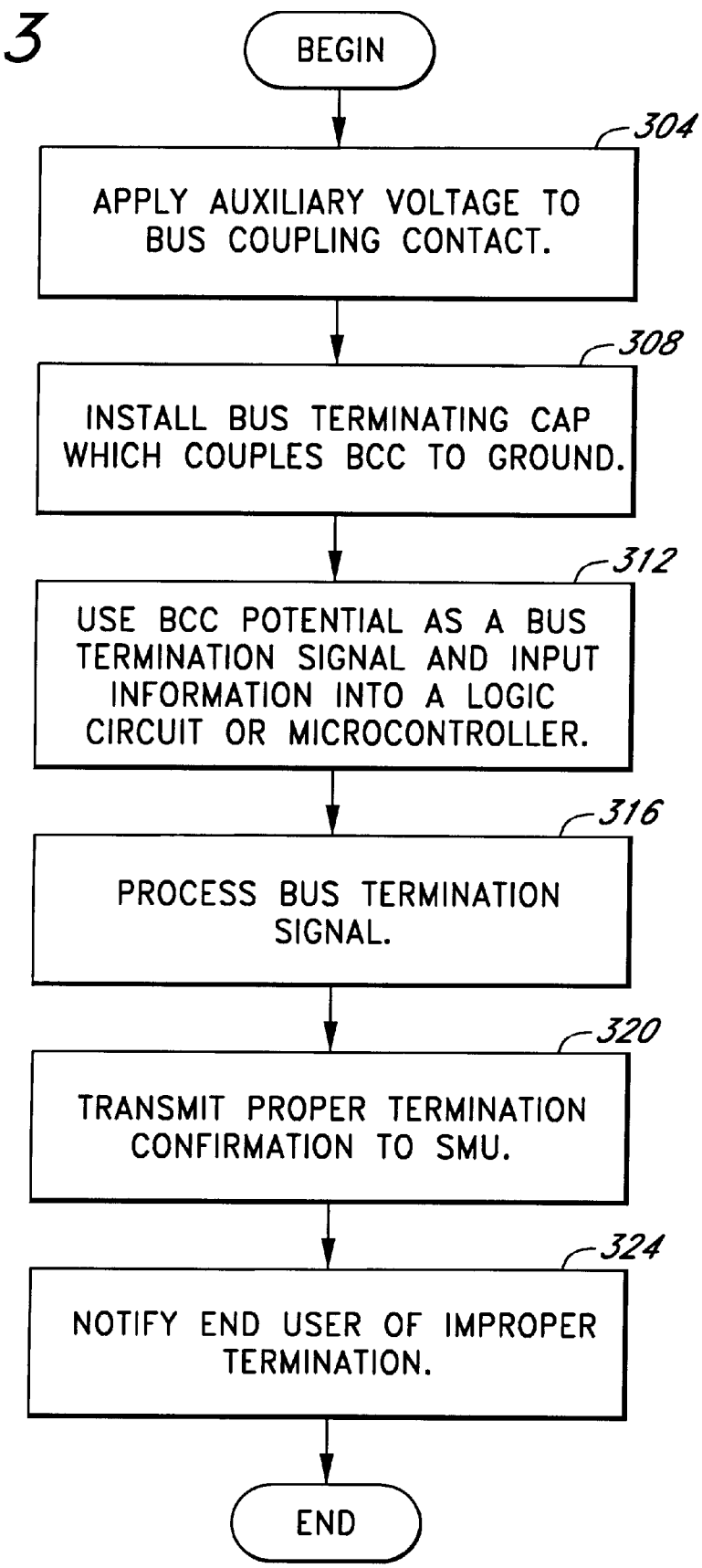

DETECTION METHOD OF BUS TERMINATION

BACKGROUND OF THE INVENTION

1. Field of the Invention

The present invention relates to determining whether an information carrying bus used in an in-flight entertainment system is properly terminated.

2. Description of Related Art

Over the last few decades, commercial aircraft have become a necessary mode of travel for personal and business reasons. In order to improve passenger comfort, many commercial airlines now offer on-board telephony as well as in-flight entertainment such as video games, pay-per-view movies, hotel reservations services, and the like. Such amenities require supporting electronics distributed through the aircraft. Maintenance of the sophisticated electronics in in-flight entertainment systems (IFE) is a major concern of the airlines.

Quick servicing and maintenance of aircraft is important to the airline industry. The amount of time an aircraft spends on be ground represents lost flying time and lost profits. Diagnostic equipment which hooks up quickly to electronics aboard the aircraft and rapidly identifies problems is an important part of reducing aircraft servicing time. Designs which integrate the diagnostic electronics into the aircraft further reduce aircraft servicing time, thereby increasing aircraft flight time and airline industry profitability.

Diagnosis and maintenance of the IFE can be difficult because many of the entertainment system components, such as multiple seat electronic units (SEUs) are distributed throughout the passenger section of the aircraft. Each seat electronic unit (SEU) interfaces the IFE to several seats. Servicing SEUs scattered throughout the passenger section of an aircraft is a time consuming and tedious task. Thus there exists a need for a quick and efficient method of quickly diagnosing the entire IFE system.

One solution involves using an interconnect bus to link chains (i.e., daisy chain) of SEUs in a particular zone. In one implementation of a system sold by Sony Trans Com Inc. of Irvine, Calif., a common bus allows each SEU to communicate diagnostic information to a system manager unit (SMU) which oversees operation of the system. Diagnostic routines in the SEU and the SMU enable quick diagnosis of an entire daisy chained collection of SEUs greatly simplifying the diagnosis procedure.

After the SMU identifies a particular SEU as defective, the SEU can be rapidly replaced with a new SEU. In one embodiment designed by Sony Trans Com Inc., the SEUs throughout the aircraft have the same design and are thus interchangeable. The interchangeable characteristic of the SEU allows quick swapping and replacement of defective units and simplifies maintenance of the SEUs.

The rapid swapping of interchangeable SEUs sometimes results in an improper termination of the bus connecting the daisy chain of SEUs. In particular, the final seat electronics unit (FSEU) connected to the bus of daisy chained SEUs must include a terminating cap to properly terminate the bus. In one embodiment, the terminating cap includes a 100 ohm load resistor or other appropriate load which properly terminates the bus.

Failure to properly terminate the bus by putting a terminating cap on the last or final SEU (the FSEU) results in errors being introduced onto the bus. These errors result from uncontrolled reflections, primarily due to impedance mismatch. Such errors make communications unreliable. These errors may appear as various unpredictable error messages on the monitoring or diagnostic devices connected to the bus. Furthermore, a failure to properly terminate the bus results in electromagnetic emissions when the entertainment system is in use. Such electromagnetic emissions are particularly unsuitable for airborne applications where they may violate regulations promulgated by the Federal Aviation Administration.

In the rapid servicing of aircraft, airline personnel may easily forget to install the terminating cap as they swap SEUs. In light of the ease with which time pressured airline personnel may forget to install a terminating cap on a FSEU to terminate a bus, and the many problems associated with the failure to properly terminate the bus, a quick, efficient and inexpensive method of verifying the proper termination of a bus for a chain of SEUs is desirable. In particular, a system is needed which can quickly indicate to a monitoring unit when there is a failure to terminate a FSEU with an appropriate terminating cap.

SUMMARY OF THE INVENTION

The present invention relates to a system for generating a bus termination signal and relaying an error message to a diagnostic unit when a signal from a SEU microcontroller indicates that a terminating cap used for terminating a bus is not properly installed. The present invention particularly relates to such a system as used in an airborne in-flight entertainment system.

The detector circuit of the present invention detects when a bus terminating cap is properly coupled to the final seat electronic unit (FSEU). Detection is accomplished by applying an auxiliary voltage to a bus coupling contact (BCC) in a bus coupling connector. The bus coupling connector is mounted on the FSEU. When the terminating cap is properly installed, the BCC couples to the input of a detection loop inside the terminating cap. The output of the detection loop is coupled to ground. Thus when the terminating cap is properly installed, a current flows through the detection loop grounding the BCC. The potential of BCC thus represents a bus termination signal indicating that the terminating cap is properly installed.

A microcontroller in the FSEU monitors the state of the BCC. The microcontroller processes the status of the BCC to determine whether the bus is appropriately terminated. This information is transferred, along with other diagnostic information to the SMU. If the bus is inappropriately terminated, the microcontroller transmits an error signal to the SMU which notifies service personnel of the problem. The entire process takes a matter of only a few minutes and facilitates servicing of SEUs scattered throughout the plane in a short time span.

BRIEF DESCRIPTION OF THE DRAWINGS

The advantages of the present invention will become more readily apparent to those ordinarily skilled in the art after reviewing the following detailed description and accompanying drawings, wherein:

FIGS. 1a and 1b illustrate an exemplary in-flight entertainment system for use with the bus termination detection circuitry.

FIG. 3 is a flow chart diagram of one embodiment of the operation of the bus termination detection circuitry.

DETAILED DESCRIPTION OF THE INVENTION

Figure 1B:
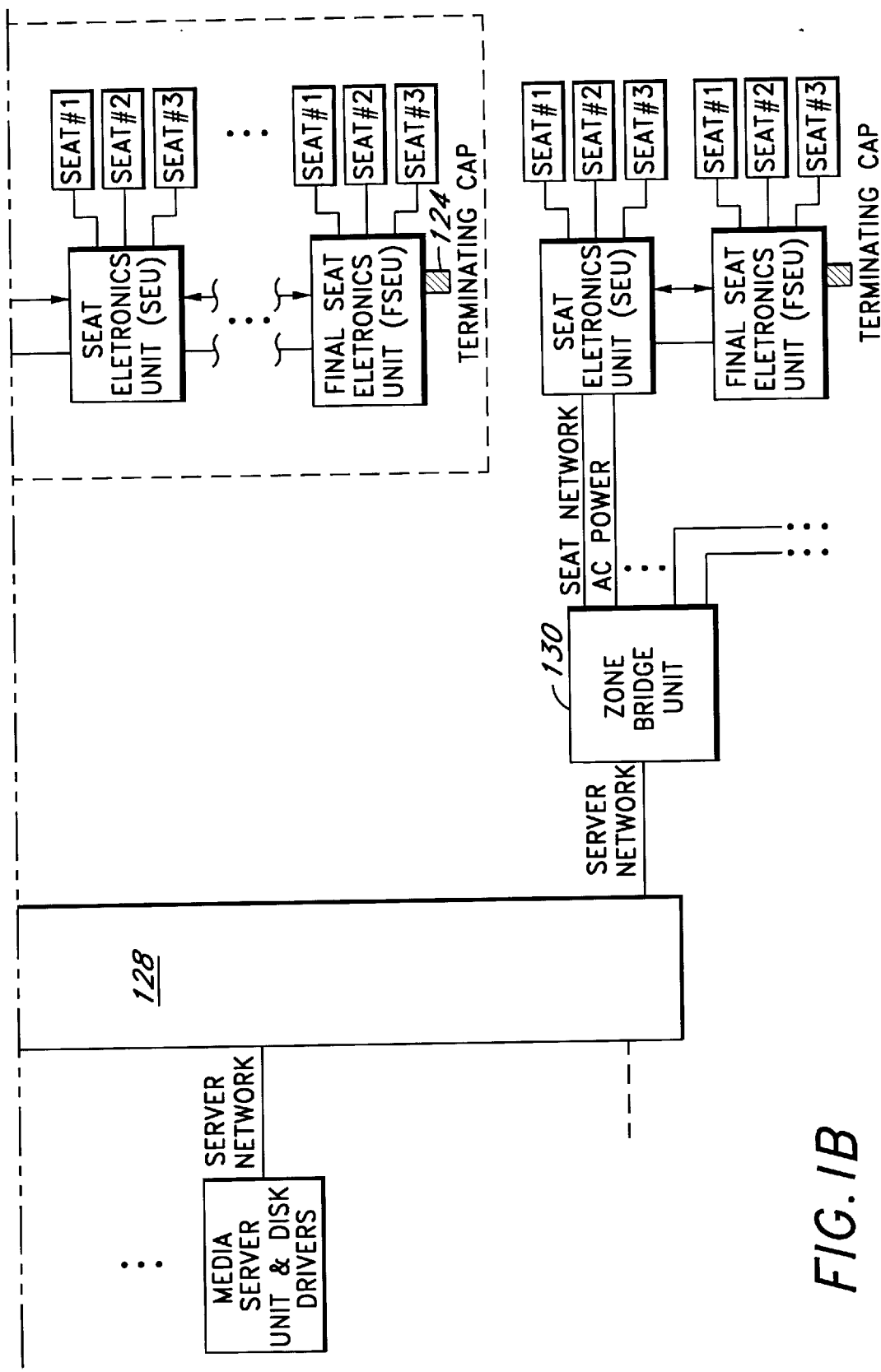

FIGS. 1a and 1b together show an overall schematic view of the bus termination system as used in a flight entertainment system for airborne applications. The bus termination electronics includes an interconnect bus 104, a daisy chain 106 of interconnecting seat electronic units (SEUs) 108, 112, 120 and a terminating cap 124. Each daisy chain 106 is connected such that the output of one SEU is connected to the input of the next SEU until the final seat electronics unit (FSEU) 120 is reached. The SEUs receive the audio and video signals from a Zone Bridge Unit (ABU) 125. Each ZBU 124 supports multiple daisy chains 106, 126. A Server Network Hub 128 coordinates and communicates the information to and from multiple ZBUs 125, 130 to supporting electronics.

Each SEU, e.g. SEU 108, provides the necessary audio and video signals to support a number of passenger seats 132, 136, 140 in the passenger compartment of an aircraft. In one embodiment, an SEU may support two to three passenger seats depending on the aircraft configuration used. In the described embodiment, up to 12 SEUs are daisy chained together although the number of SEUs in a daisy chain may vary.

Each ZBU 125 services one section or zone of an aircraft. A ZBU 125 may service multiple daisy chains 106, 126. In one design, daisy chain 106, 126 may serve an aisle of a plane while each ZBU 125 serves a plane section. The bus which forms each daisy chain 106, is terminated at the FSEU 120. The FSEU includes terminating cap 124 which terminates interconnect bus 104.

ZBU 125 distributes audio and video data on a seat network bus 144 and power along power line 148 to the various SEUs 108, 112. The system may also receive data, such as credit card information, entertainment requests, or merchandise orders, from seat electronics (not shown) in the vicinity of passenger seat 132, 136, 140. The respective SEU unit 108 receives the data and may then transfer the data to the respective ZBU 125 via seat network bus 144. This information may be further transmitted through the server network hub 128 to other electronics aboard the aircraft, or in the case of telephone or other communication to a public switched telephone network ("PSTN") or other external networks outside of the aircraft through a system interface unit 148. A system manager unit (SMU) 152 oversees operation of the IFE. The SMU 152 is coupled to a display device 156 which displays passenger requests and system status information. A floppy drive 160 is also provided for storing data.

The IFE, including the SMU 152 and the SEUs 108, 112, 120 is designed to perform self diagnostic checks. In particular, the SEUs perform diagnostic checks and may forward error messages to the SMU. For example, if terminating cap 124 is not properly installed, a microcontroller or other supporting electronics in the FSEU 120 will cause an error message to be transmitted through interconnect bus 104, seat network bus 144, and via server network hub 128 to SMU 152. The SMU 152 then displays the error on display device 156 or the information is stored on a floppy disk or other removable storage medium 160 for further use or analysis. This information enables technicians or maintenance personnel to quickly troubleshoot the IFE system.

Server network hub 128 may further be coupled to other units which provide information such as Data Server Units (DSUs) 164 and Media Controller Units (MCUs) 168 which provide the video/audio contact.

Figure 2:
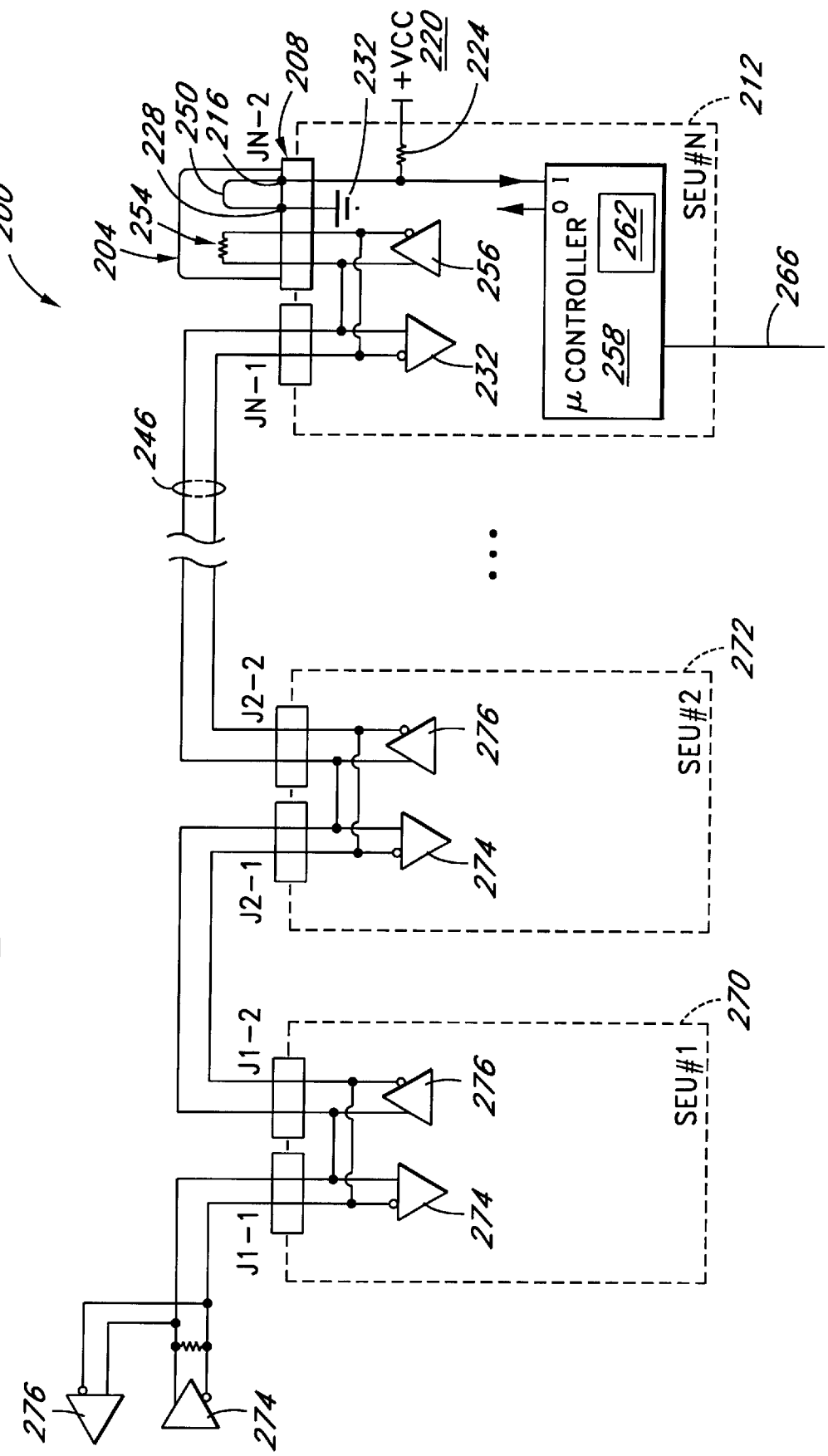
FIG. 2 is an embodiment of the current invention shown as a functional block diagram.

FIG. 2 is a block diagram schematic of the bus detection system 200 for determining when a terminating cap 204 is coupled to a final bus connector 208 of the FSEU 212. Although FIG. 2 illustrates a direct physical coupling between the FSEU 212 and the terminating cap 204, other elements, including but not limited to a segment of bus line 104, may be used to couple the terminating cap 204 to the FSEU 212.

A bus termination signal is generated at bus coupling contact (BCC) 216. In one embodiment, an auxiliary voltage, ($V_{cc}$) 220, of about 5 volts, supplies power to the BCC through a resistor 224. The resistor may be any number of values, in the described embodiment a resistor with a resistance of 1–10K resistance ohms is used. The precise values may be adjustable and depends on system parameters. Higher resistor values make the system more prone to noise but offer the advantage of lower power consumption. A second connector, bus ground contact (BGC) 228 in the final bus connector 208 is directly connected to ground 232. If the final bus connector 208 is not terminated by either a bus termination 204 or coupled to another SEU unit via continuation of interconnect bus 246, then BCC 216 will be open circuited and will have a potential approximately that of the auxiliary voltage 220 (about 5 volts). A high potential or logic high at BCC 216 represents a bus termination signal that indicates the interconnect bus 246 is improperly terminated.

Terminating cap 204 includes a detection loop 250 which couples the BCC 216 to the BGC 228. Detection loop 250 grounds BCC 216 when the bus termination 204 is properly installed. Thus the grounding or unasserted state of BCC 216 represents a bus termination signal indicating that the interconnection bus is properly terminated. Terminating cap 204 includes a resistor 254 which properly terminates the output of the final output driver 256 of the FSEU 212.

In one embodiment, the terminating cap is a custom made d-sub miniature connector. One method of forming an appropriate custom made d-sub miniature connector is to use off the shelf d-sub shells formed of shielded metal to reduce EMI emissions. A crimp resistor is crimped wacross two pins to form a termination. Jumper connectors may also be installed across chosen pins to form the detection loop.

A monitoring circuit, which may be a microprocessor or microcontroller 258 in the FSEU 212 receives the bus termination signal from the BCC 216. Other embodiments of a monitoring circuit may use logic circuitry in place of the standard microcontroller 258. In the pictured embodiment, monitoring software or subroutines 262 programmed into the microcontroller 258, in one embodiment an Intel 8196 NT, processes the input bus termination signals from BCC 216 and converts the signals into an appropriate form to be transferred via driver 256 through interconnect bus 246 to the SMU 152 of FIG. 1. The information may also be transferred directly from the microcontroller 258 to diagnostic equipment via a direct connect line 266 coupled to microcontroller 258.

The FSEU 212 is coupled to other SEUs 270, 272 via interconnect bus 246 which in one embodiment is an RS 485 bus defined in the publication "EIA Standard for Electrical Characteristics of Generators and Receivers for use in Balanced Digital Multipoint Systems, RS-485", Electronic Industries Association, Washington, D.C., April 1983. In the embodiment shown in FIG. 2, each SEU 270, 272 has the same architectural configuration as the FSEU 212. Each SEU includes a receiver circuit 274 as well as a driver circuit 276 configured to support the respective bus (in the illustrated example, a RS 485 bus). The receiver circuit receives information from either the driver 278 of a ZBU 124 or from a driver 276 of another SEU unit. In general the first SEU 270 receives the signal from the driver 278 of the ZBU 124, and subsequent SEU units 272, including the FSEU 212, receive their input signals from the driver circuit 276 of the SEU immediately coupled to the receiving SEU. In one aircraft embodiment, up to twelve and usually around eight SEUs are coupled in a daisy chain configuration between the first SEU 270 and the FSEU 212.

The FSEU 212 when properly terminated by bus termination 204 terminates the FSEU driver 256 with a resistor 254. In the embodiment shown in FIG. 2, final bus termination resistor 254 is approximately 100 ohms. However the termination resistance value may vary and should be chosen to match the impedance of the bus being terminated. Proper termination of the interconnect bus 246 with the termination resistor 254 helps prevent reflections of signals back into the FSEU driver 256. Such reflections may occur in impedance mismatch conditions. Uncontrolled reflected signals which propagate back through interconnect bus 246 to the ZBU 130 may cause inaccurate readings in the ZMU processing electronics (not shown).

When the terminating cap 204 is not properly coupled, an error signal from the microcontroller 258 indicating improper termination of the final bus connector 208 may be corrected either physically or electronically. Physically correcting the improper termination involves informing the end user or the person monitoring the SMU output via an error message to physically connect a proper bus termination 204 to the final bus connector 208. A second possibility is to electronically compensate for the lack of a terminating cap by adjusting internal resistances within the system.

FIG. 3 shows one method of implementing the described system. FIG. 3 is a flow chart diagram of the operation of the bus termination sensing circuitry. In step 304, an auxiliary voltage is applied to the BCC. The voltage of the BCC represents the bus termination signal. The applied auxiliary voltage value remains until a terminal cap 204 is coupled to the final bus connector 208. The installation of the terminating cap couples the BCC to the BGC (step 308). When the bus terminating cap is properly installed, the detection loop in the terminating cap, grounds or deasserts BCC.

The potential or voltage of the BCC represents a bus termination signal. This signal is input into a monitoring circuit, which may be a logic circuit or as a microcontroller step 312. The microcontroller processes this bus termination signal step 316 and generates an appropriate control signal indicating either proper termination or improper termination. The control signal is transferred from the microcontroller back through an interconnect bus or through a direct connection to the diagnostic equipment or SMU step 320. The SMU notifies the person operating the system of improper termination via a variety of techniques, such as a graphical user interface indication in a display device or via an error code on the display device step 324. In more sophisticated embodiments, diagnostic equipment may also instruct the microcontroller to compensate for the improper termination by adjusting various parameters within the drivers.

Although the preceding detailed description has described Applicant's invention in the context of an in-flight entertainment system which detects the termination of an interconnect bus; other embodiments of Applicant's invention are contemplated. For example, Applicant's invention may be used to detect the termination of other communication buses in an aircraft. The invention is particularly suitable for devices in which maintenance needs to be accomplished quickly. Thus Applicant's invention is also applicable to the detection of communication bus terminations in other transportation vehicles such as busses, trains, and ships.

Thus, while certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. An in-flight entertainment system including a system for detecting whether an interconnect bus is properly terminated, said in-flight entertainment system comprising:
   a plurality of electronic units, each electronic unit having a bus connector for coupling said electronic unit to said interconnect bus;
   a terminating cap coupled to a final bus connector, said terminating cap coupling a detection loop to a bus coupling contact, said detection loop designed to ground a bus coupling contact of said final bus connector thereby indicating a proper termination; and
   a monitoring circuit coupled to said interconnect bus, said monitoring circuit verifying that said bus coupling contact has been grounded.

2. The in-flight entertainment system of claim 1 wherein said plurality of electronic units controls audio and video signals traveling to passengers using said in-flight entertainment system.

3. The in-flight entertainment system of claim 1 wherein said detection loop couples said bus coupling contact to a ground contact in said final bus connector causing a bus termination signal to be generated which indicates that said terminating cap is coupled to said final bus connector.

4. The in-flight entertainment system of claim 1, wherein said monitoring circuit receives said bus terminating signal resulting from grounding of the bus coupling contact, said monitoring circuit processing said bus terminating signal and generating a control signal for transmission along said interconnect bus.

5. A system for detecting whether an interconnect bus is properly terminated, said system comprising:
   a plurality of electronic units, each electronic unit having a bus connector for coupling said electronic unit to said interconnect bus;
   a terminating cap coupled to a final bus connector, said terminating cap coupling a detection loop to a bus coupling contact, said detection loop designed to ground a bus coupling contact of said final bus connector thereby indicating a proper termination; and
   a monitoring circuit coupled to said interconnect bus, said monitoring circuit verifying that said bus coupling contact has been grounded.

6. The system of claim 5 wherein said detection loop couples said bus coupling contact to a ground contact in said final bus connector causing a bus termination signal to be generated which indicates that said terminating cap is coupled to said final bus connector.

7. The system of claim 5, wherein said monitoring circuit receives said bus terminating signal resulting from grounding of the bus coupling contact, said monitoring circuit processing said bus terminating signal and generating a control signal for transmission along said interconnect bus.

8. The system of claim 7 wherein said monitoring circuit comprises a microcontroller.

9. The system of claim 7 wherein said monitoring circuit comprises a plurality of logic gates.

10. The system of claim 5 wherein said monitoring circuit comprises a microprocessor.

11. The system of claim 5 wherein said detection loop couples said bus coupling contact to a shield of said final bus connector.

12. The system of claim 5 further comprising an auxiliary power supply which supplies power to said bus coupling contact.

13. A method of determining whether a bus is properly terminated comprising the steps of:

applying a voltage to a bus coupling contact;

grounding said bus coupling contact if a terminating cap is coupled to a bus connector;

generating a bus termination signal based on the potential of said bus coupling contact.

14. The method of claim 13 further comprising the steps of:

processing said bus termination signal and generating a control signal indicating proper termination if said terminating cap is coupled to said bus connector;

transmitting said control signal along said bus.

15. The method of claim 13 when said grounding step is executed by coupling said bus coupling contact to a bus ground contact located in a final bus connector.

16. The method of claim 13 wherein said grounding step is executed by coupling said bus coupling contact to a shielding of said bus.

17. The method of claim 14 further comprising the steps of:

receiving said control signal at a managing unit; and, displaying an error signal on a display device if said bus is not properly terminated.

18. The method of claim 14 wherein said method further includes the step of:

transmitting an address of an electronic unit which improperly terminates said bus.

19. An electronic system, the system configured to simplify maintenance procedures, said system comprising:

a plurality of electronic units connected via a serial bus;

a final electronic unit coupled to the bus, said final electronic unit including a terminating cap having a connection which deasserts an asserted signal to indicate to a processor in said final electronic unit that the final electronic unit is properly terminated.

20. The electronic system of claim 19 wherein said processor transmits a signal to a system manager unit which simplifies maintenance procedures by causing said system manager unit to notify service personnel that said final electronic unit is improperly terminated.

21. The electronic system of claim 19 further comprising a network server hub which directs information flow between a system manager unit and the final electronic unit.

22. The electronic system of claim 20 further including a second daisy chain of electronic units, said second daisy chain of electronic units coupled to a second final electronic unit sending a second signal indicating proper termination of said second final electronics unit.

* * * * *

UNITED STATES PATENT AND TRADEMARK OFFICE
CERTIFICATE OF CORRECTION

PATENT NO.    : 5,939,997
DATED         : August 17, 1999
INVENTOR(S)   : Sekine et al.

It is certified that error appears in the above-identified patent and that said Letters Patent is hereby corrected as shown below:

In column 3 at line 13 delete "124" and insert --125--

Signed and Sealed this

Twenty-seventh Day of March, 2001

Attest:

NICHOLAS P. GODICI

Attesting Officer

Acting Director of the United States Patent and Trademark Office